(12) United States Patent
Kim et al.

(10) Patent No.: US 8,313,539 B2
(45) Date of Patent: Nov. 20, 2012

(54) METHOD OF FABRICATING AN ANODE AND A LITHIUM BATTERY

(75) Inventors: Young-Jun Kim, Daejeon (KR); Jae-Hou Nah, Cheonan (KR)

(73) Assignee: Samsung SDI Co., Ltd., Yongin-si (KR)

( * ) Notice: Subject to any disclaimer, the term of this patent is extended or adjusted under 35 U.S.C. 154(b) by 591 days.

(21) Appl. No.: 11/593,691

(22) Filed: Nov. 6, 2006

(65) Prior Publication Data

US 2007/0051010 A1 Mar. 8, 2007

Related U.S. Application Data

(62) Division of application No. 10/767,875, filed on Jan. 29, 2004, now abandoned.

(30) Foreign Application Priority Data

Jan. 29, 2003 (KR) .............................. 2003-0005997

(51) Int. Cl.
*H01M 10/04* (2006.01)
*H01M 10/52* (2006.01)

(52) U.S. Cl. ................... 29/623.1; 429/322; 429/231.95; 429/57

(58) Field of Classification Search ........................ None
See application file for complete search history.

(56) References Cited

U.S. PATENT DOCUMENTS

| | | | |
|---|---|---|---|
| 4,565,751 A * | 1/1986 | Faust et al. ...................... | 429/94 |
| 5,618,640 A | 4/1997 | Idota et al. | |
| 5,639,573 A * | 6/1997 | Oliver et al. .................. | 429/303 |
| 5,753,387 A | 5/1998 | Takami et al. | |
| 6,232,021 B1 * | 5/2001 | Negoro .......................... | 429/328 |
| 6,423,447 B1 * | 7/2002 | Ohsaki et al. .................. | 429/217 |
| 6,465,121 B1 * | 10/2002 | Dawson et al. .................. | 429/51 |
| 6,573,004 B1 | 6/2003 | Igarashi et al. | |
| 2003/0152835 A1 * | 8/2003 | Dasgupta et al. ............. | 429/232 |
| 2003/0194607 A1 * | 10/2003 | Huang ........................... | 429/176 |
| 2004/0146786 A1 * | 7/2004 | Sato et al. ...................... | 429/326 |

FOREIGN PATENT DOCUMENTS

| | | |
|---|---|---|
| CN | 1212473 A | 3/1999 |
| JP | 2001-23630 | 1/2001 |
| JP | 2002-164076 | 6/2002 |
| KR | 2000-0014672 | 3/2000 |
| KR | 10-2001-0038935 | 5/2001 |
| WO | WO02093679 A2 * | 11/2002 |

OTHER PUBLICATIONS

Patent Abstracts of Japan, Publication No. 2001-023630, dated Jan. 26, 2001, in the name of Keiichi Hirata et al.
Patent Abstracts of Japan, Publication No. 2002-164076, dated Jun. 7, 2002, in the name of Tetsuya Hayashi et al.
Korean Patent Abstracts for Publication No. 1020000014672, date of publication of Mar. 15, 2000, in the name of Jin Gyeong Kim.

(Continued)

*Primary Examiner* — Keith Walker
(74) *Attorney, Agent, or Firm* — Christie, Parker & Hale, LLP

(57) ABSTRACT

Disclosed is a method of preparing a negative electrode for a rechargeable lithium battery. The steps include vacuum-drying a negative electrode precursor, the negative electrode precursor comprising a negative active material and an aqueous binder. The steps may further include vacuum-drying a lithium cell battery that includes a vacuum-dried negative electrode.

4 Claims, 2 Drawing Sheets

OTHER PUBLICATIONS

Korean Patent Abstracts for Publication No. 1020010038935, date of publication of May 15, 2001, in the name of Jon Ha Lee et al.

Thomas, P. et al., Electrochemical Insertion of Sodium into Hard Carbons, Pergamon, Electrochimica Acta 47, Apr. 15, 2002, 3303-3307, www.Elsevier.com/locate/electacta.

Yoshida, H., et al., Degradation Mechanism of Alkyl Carbonate Solvents Used in Lithium-ion Cells During Initial Charging, Elsevier, Journal of Power Sciences 68, Mar. 3, 1997, 311-315.

U.S. Advisory action dated Oct. 19, 2010, for U.S. Appl. No. 10/767,875.

* cited by examiner

METHOD OF FABRICATING AN ANODE AND A LITHIUM BATTERY

CROSS REFERENCE TO RELATED APPLICATION

This U.S. Patent application is a divisional of U.S. patent application Ser. No. 10/767,875 filed on Jan. 29, 2004 now abandoned which claims priority of and is based on Korean patent application No. 2003-5997 filed in the Korean Intellectual Property Office on Jan. 29, 2003, the entire disclosure of which is incorporated herein by reference.

FIELD OF THE INVENTION

The present invention relates to a method of preparing a negative electrode for a rechargeable lithium battery, a method of fabricating a rechargeable lithium battery, and a rechargeable lithium battery, and more particularly, to a rechargeable lithium battery that generates a reduced amount of gas.

BACKGROUND OF THE INVENTION

An electrode for a rechargeable lithium battery is produced by coating an active material composition on a current collector and drying it to form an active mass layer on the current collector. The active material composition includes an active material, a binder, optionally a conductive binder, and an organic solvent.

The active mass layer should be firmly maintained without separation from the current collector during initial charging in order to guarantee high capacity and good cycle life characteristics. Good adhesion between the active mass layer and the current collector depends on the choice of suitable binders. The binder is required to render a physical binding strength to the electrode in only a small amount, which leads to provision of a positive electrode with a high energy density. The binder must also be unreactive with the electrolyte solution and must maintain a stable form within the battery operating temperature range.

Binders satisfying such requirements include aqueous binders such as styrene rubber and carboxymethyl cellulose. However, the aqueous binders generate gas caused by moisture in the electrode, and carboxymethyl cellulose decomposes or forms thin layers on the negative electrode, thereby expanding the volume of the battery.

SUMMARY OF THE INVENTION

It is an aspect of the present invention to provide a method of preparing a negative electrode for a rechargeable lithium battery which generates less gas during the initial charging.

It is another aspect to provide a method of fabricating a rechargeable lithium battery that generates less gas during the initial charging.

It is still another aspect to provide a method of fabricating a rechargeable lithium battery that generates less gas during charging and where the composition of the gas can be controlled.

It is still another aspect to provide a rechargeable lithium battery including a negative electrode fabricated by the method.

These and other aspects may be achieved by a method of preparing a negative electrode for a rechargeable lithium battery including vacuum-drying a negative electrode precursor, wherein the negative electrode precursor includes a negative active material and an aqueous binder.

In order to achieve these aspects and others, the present invention further provides a method of fabricating a rechargeable lithium battery including assembling a negative electrode, a positive electrode, and an electrolyte to form a battery precursor, and vacuum-drying the battery precursor.

The present invention further includes a rechargeable lithium battery that generates gas containing less than 30 volume % CO based on the total amount of gas generated during an initial charging.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION

Figure 1:
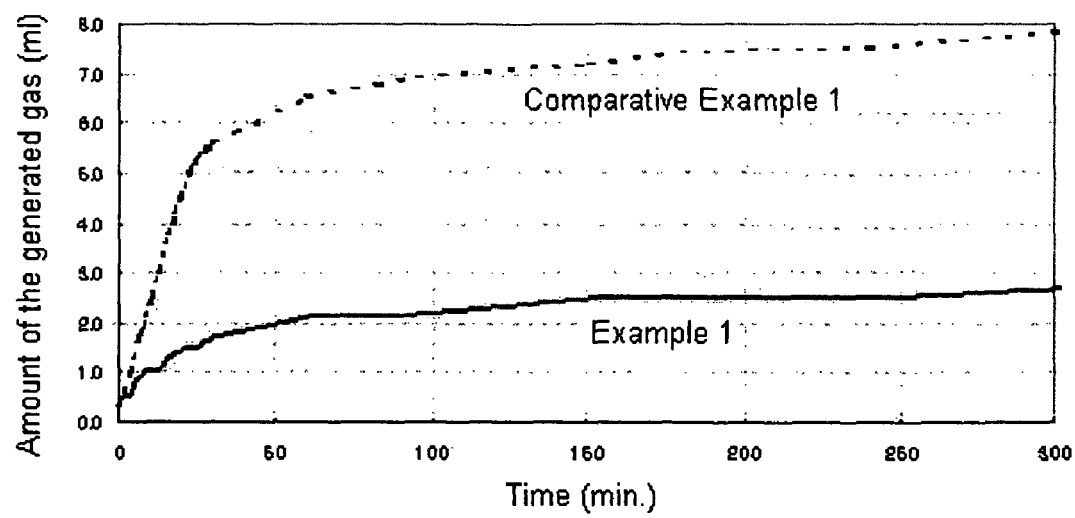
FIG. 1 is a graph showing the amounts of generated gas in rechargeable lithium batteries during initial charging, according to Example 1 of the present invention and Comparative Example 1.

In order to firmly adhere an active material on a current collector, aqueous binders such as styrene-butadiene rubber and carboxylmethyl cellulose are widely used. However, the binders cause gas generation which results in safety problems such as explosion of the battery, and deterioration of the cycle life characteristics. Thus, the amount of generated gas should be controlled and reduced, but it is generally impossible to control the amount of the generated gas after assembly of the battery. According to the present invention, the amount of gas generated can be controlled by either vacuum-drying an electrode, or removing gas during the battery fabrication.

One embodiment of the invention for controlling the amount of gas generated includes vacuum-drying a negative electrode precursor. The vacuum-drying is performed at 80 to 200° C., and preferably 90 to 150° C. under a pressure of 10 torr or less for from 1 to 72 hours. The negative electrode precursor includes a negative active material and an aqueous binder. The vacuum-drying step can remove the atmospheric gas which may be present in the electrode. Thus, it can reduce the generation of gas.

The negative electrode precursor is prepared by a conventional procedure in which a negative active material composition is coated on a current collector. The negative active material composition includes the negative active material and the aqueous binder. The negative active material may be any carbonaceous material as long as it can be generally used as the negative active material for rechargeable lithium batteries. Exemplary materials are materials in which electrochemical redox reactions occur, and in which lithium ions reversibly intercalate and deintercalate. Examples thereof are amorphous carbon or crystalline carbon. Examples of amorphous carbon materials are soft or hard carbon, mesophase pitch carbides, and sintered coke. Examples of crystalline carbon materials are shapeless, plate, flake, circular, or fiber types of natural graphite or artificial graphite.

The aqueous binder may be a mixture of butadiene-based rubbers such as styrene-butyrene rubber, acrylonitrile rubber, or acrylonitrile-butadiene-styrene rubber; and a cellulose-based compound such as carboxymethyl cellulose or hydroxypropylmethyl cellulose.

Another embodiment of the invention for controlling the amount of gas generated by a battery includes assembling a battery using a conventional negative electrode and vacuum-drying the assembled battery. The vacuum-drying is performed at a temperature not exceeding 100° C. for at least 10 minutes.

Another embodiment of the present invention includes assembling the battery with a vacuum-dried negative electrode, and again vacuum-drying the assembled battery. This procedure is quite effective at reducing the amount of gas generated.

The resulting rechargeable lithium battery generates gas with a CO content of 50% or less based on the total gas generated during the initial charging. In this application, "initial charging" means that the battery is charged at a 0.1 to 1.0 C rate for 1 to 5 cycles. Generally, gases including $H_2$, $N_2$, $O_2$, CO, $CO_2$, $CH_4$ and $C_2H_4$ are generated during the initial charging. The hydrogen gas is mainly derived from the decomposition of the atmosphere, and the CO gas is mainly derived from the decomposition of carboxymethyl cellulose, with a smaller amount derived from the formation of a thin layer on a surface of the negative electrode. Controlling the content of CO gas is critical for controlling the thickness of the battery. A battery made according to the present invention generates gas with a combined CO and $CO_2$ content of 30 volume % or less based on the total amount of gas, and 50 volume % or less based on the nitrogen gas. If the amount of the CO and the $CO_2$ gases combined is more than 30 volume % based on the total gas, the volume of the battery increases to cause possible safety problems and a swelling phenomenon.

In addition, the amount of hydrogen gas generated preferably does not exceed 0.2 volume % based on the total amount of gas generated.

Figure 3:
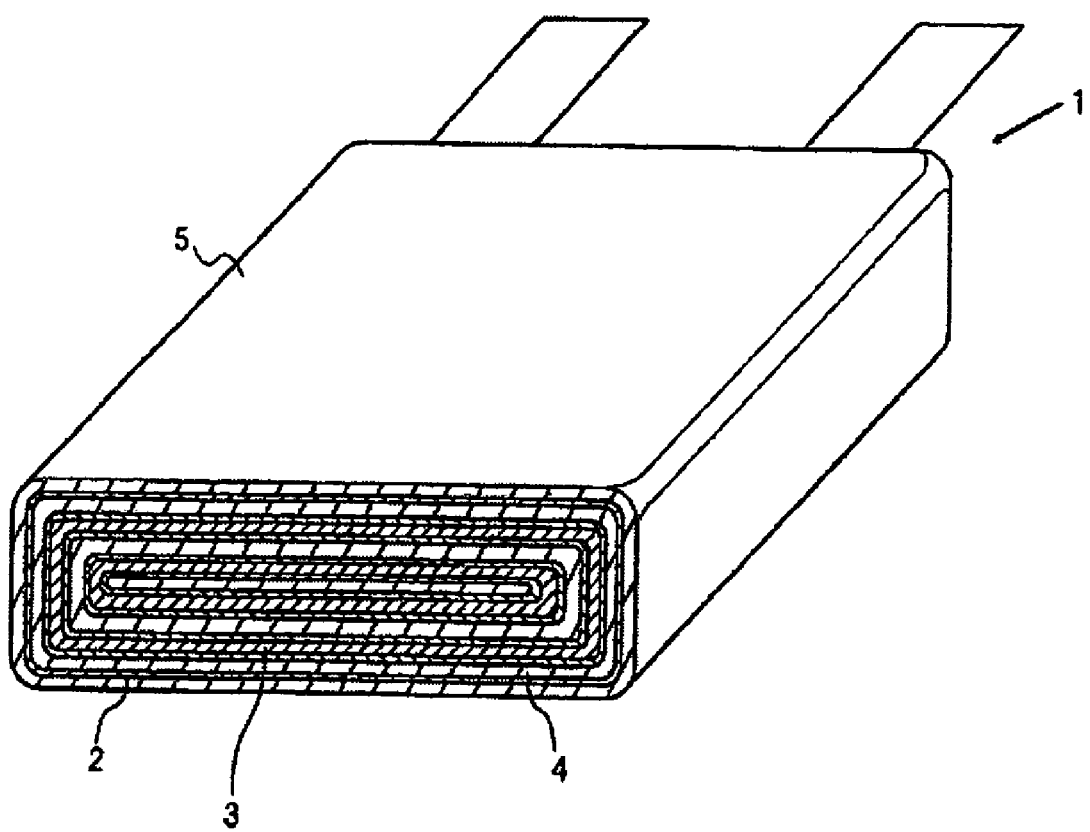
FIG. 3 is a battery according to the present invention.

An example of a rechargeable lithium battery according to the invention is shown in FIG. 3. The lithium-sulfur battery 1 includes a positive electrode 3, a negative electrode 4, and a separator 2 interposed between the positive electrode 3 and the negative electrode 4. The positive electrode 3, the negative electrode 4, and the separator 2 are contained in a battery case 5. The electrolyte is present between the positive electrode 3 and the negative electrode 4.

The following examples further illustrate the present invention in detail, but are not to be construed to limit the scope thereof.

EXAMPLE 1

96 g of graphite, 2 g of carboxymethyl cellulose and 2 g of styrene-butadiene rubber were mixed in water to prepare a negative active material slurry. The negative active material slurry was coated on a Cu foil and dried followed by pressing, thereby obtaining a negative electrode.

The negative electrode was vacuum-dried at 90° C. for 1 hour. Using the vacuum-dried negative electrode, a $LiCoO_2$ positive electrode, and an electrolyte including 1 M $LiPF_6$ in a mixed solvent of ethylene carbonate and methylene carbonate (1:1 volume ratio), a rechargeable lithium cell was fabricated.

EXAMPLE 2

A rechargeable lithium cell was fabricated by the same procedure as in Example 1 except that the vacuum-drying step was performed at 120° C. for 1 hour.

EXAMPLE 3

96 g of graphite, 2 g of carboxymethyl cellulose, and 2 g of styrene-butadiene rubber were mixed in water to prepare a negative active material slurry. The negative active material slurry was coated on a Cu foil and dried followed by pressing, thereby obtaining a negative electrode.

Using the negative electrode, a $LiCoO_2$ positive electrode, and an electrolyte including 1 M $LiPF_6$ in a mixed solvent of ethylene carbonate and methylene carbonate (1:1 volume ratio), a rechargeable lithium cell was fabricated.

EXAMPLE 4

96 g of graphite, 1 g of carboxymethyl cellulose and 1 g of styrene-butadiene rubber were mixed in water to prepare a negative active material slurry. The negative active material slurry was coated on a Cu foil and dried followed by pressing, thereby obtaining a negative electrode.

The negative electrode was vacuum-dried at 90° C. for 1 hour. Using the vacuum-dried negative electrode, a $LiCoO_2$ positive electrode, and an electrolyte including 1 M $LiPF_6$ in a mixed solvent of ethylene carbonate and methylene carbonate (1:1 volume ratio), a rechargeable lithium cell was fabricated. The lithium cell was again vacuum-dried at 100° C.

COMPARATIVE EXAMPLE 1

A rechargeable lithium cell was fabricated by the same procedure as in Example 1, except that the vacuum-drying step was not performed.

The rechargeable lithium cells according to Examples 1 to 2, and Comparative Example 1 were initially-charged (formation). At this time, the generated gas was gathered and the composition was analyzed. The results are presented in Tables 1 and 2. The results in Table 1 indicate the relative volume as a percent of the total, and those in Table 2 indicate the volume of each component as a percentage based on $N_2$ which was added from atmosphere. The analysis was performed by injecting 0.1 cc of the gathered gas into a column and using a gas chromatography

TABLE 1

|  | Comparative Example 1 | Example 1 | Example 2 |
|---|---|---|---|
| $H_2$ | 0.3 | Trace amount | Trace amount |
| $N_2$ | 47.2 | 63.5 | 74.7 |
| $O_2$ | 12.0 | 10.7 | 12.2 |
| CO | 37.6 | 23.7 | 11.2 |
| $CH_4$ | 1.6 | 1.5 | 1.4 |
| $C_2H_4$ | 1.3 | 0.5 | 0.3 |

TABLE 2

|  | Comparative Example 1 | Example 1 | Example 2 |
|---|---|---|---|
| $H_2$ | 0.6 | Trace amount | Trace amount |
| $N_2$ | 100 | 100 | 100 |
| $O_2$ | 25.4 | 16.9 | 16.3 |
| CO | 79.7 | 37.3 | 15.0 |

TABLE 2-continued

|  | Comparative Example 1 | Example 1 | Example 2 |
|---|---|---|---|
| $CH_4$ | 3.4 | 2.4 | 1.9 |
| $C_2H_4$ | 2.8 | 0.8 | 0.4 |

Amount of Gas Generated

The amounts of gas generated in the cells according to Example 1 and Comparative Example 1 are shown in FIG. 1. It is evident from FIG. 1 that the amount of generated gas is very much smaller for Example 1, the cell with the vacuum-dried negative electrode, than for Comparative Example 1, the cell with the non-vacuum-dried negative electrode.

Thickness Variation

Figure 2:
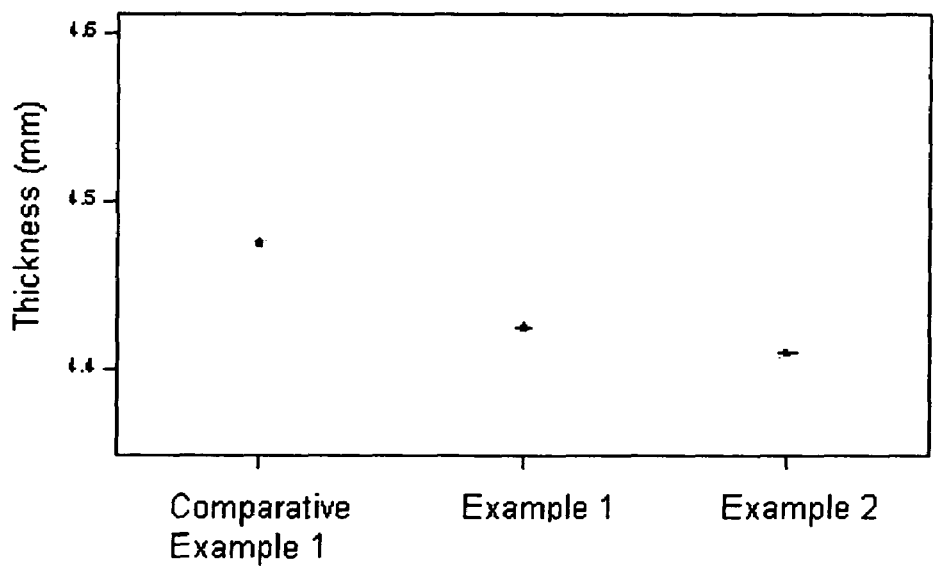
FIG. 2 is a graph showing the thicknesses of the rechargeable lithium batteries after initial charging, according to Example 1 of the present invention and Comparative Example 1.

The initial thicknesses of the cells according to Examples 1 and 2 and Comparative Example 1 were measured to be 4.2 mm. After the initial charging, the thickness of the cells according to Examples 1 and 2, and Comparative Example 1 were again measured, and the results are presented in FIG. 2. FIG. 2 indicates that a much more severe thickness variation occurred in the cell with the non-vacuum-dried negative electrode according to Comparative Example 1 compared to Example 1, and as the vacuum-drying temperature increases from 90° C. as was done in Example 1, to 120° C. as was done in Example 2, the thickness variation was reduced further.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of fabricating a rechargeable lithium battery comprising:
    assembling a negative electrode, a positive electrode, and an electrolyte to form a battery precursor; and
    vacuum-drying the battery precursor at a temperature not exceeding 100° C. for at least 10 minutes,
    wherein the negative electrode is prepared by vacuum-drying a negative electrode precursor including a negative active material and an aqueous binder at a temperature from 80 to 200° C. under a pressure of 10 torr or less for 1 to 72 hours.

2. The method of claim 1 further comprising:
    performing initial charging on the battery and generating gas having a $H_2$ content of 0.2 volume % or less.

3. A method of fabricating a rechargeable lithium battery comprising:
    preparing a negative electrode from a negative electrode composition comprising a negative active material and an aqueous binder;
    assembling the negative electrode, a positive electrode, and an electrolyte to form a battery precursor;
    vacuum-drying the battery precursor at a temperature not exceeding 100° C. for at least 10 minutes; and
    performing initial charging on the battery and generating gas having a CO content of 30 volume % or less and a $H_2$ content of 0.2 volume % or less,
    wherein the negative electrode is prepared by vacuum-drying a negative electrode precursor including the negative active material and the aqueous binder at a temperature from 80 to 200° C. under a pressure of 10 torr or less for 1 to 72 hours.

4. The method of claim 3, wherein the aqueous binder is carboxymethyl cellulose.

* * * * *